UNITED STATES PATENT OFFICE.

JOHN ROGER, OF LONDON, ENGLAND, AND MONTAGUE KELWAY BAMBER, OF COLOMBO, CEYLON.

PROCESS OF OBTAINING EXTRACT OF TEA.

SPECIFICATION forming part of Letters Patent No. 726,102, dated April 21, 1903.

Application filed October 20, 1902. Serial No. 128,077. (No specimens.)

*To all whom it may concern:*

Be it known that we, JOHN ROGER, a resident of London, England, and MONTAGUE KELWAY BAMBER, a resident of Colombo, Ceylon, subjects of the King of Great Britain and Ireland, have invented a certain new and useful Improved Process of Obtaining a Soluble Extract of Tea, (for which we have filed an application for British Patent No. 7,744, dated April 2, 1902; a petition for Ceylon Patent, filed January 3, 1901, and an application for British India Patent, filed July 23, 1901;) and we do hereby declare the following to be a full, clear, and exact description of the same.

The object of our invention is to produce from the leaf of the tea-plant, either green as plucked from the bush or prepared as the ordinary tea of commerce, a soluble extract possessing the special aroma, flavor, and pungency and all the invigorating properties of the ordinary well-known article of commerce called "tea," but being in a much more convenient form than such article.

In making our extract of green leaves as plucked from the bush we wither them or wilt them and roll or disintegrate them by any usual means, and then or after oxidizing or fermenting the wet mass, so as to oxidize the tannin and theine principles to any required extent, according to the degree of pungency required in the final product without firing the leaf, we extract and bring the desired valuable principles of the tea into solution by steeping the leaves in hot water, preferably of, say, from 180° to 212° Fahrenheit for, say, five minutes, and then run off the fluid and express it from the mass by any suitable means.

In making our extract from the prepared or ordinary-made tea of commerce we commence by extracting said principles and bringing the same into solution by steeping the leaf in hot water and running off and expressing the fluid from the mass, as above described. If the whole of said principles are not brought into solution by such treatment, the latter may be repeated. The extract solution so obtained is then in any suitably-adapted apparatus, such as a steam-jacketed or coil-provided vessel, kept at or brought to such a temperature—say about 200° to 212° Fahrenheit—as will keep all said principles in solution, and in this state it is passed through a centrifugal separator having a solid walled drum with a top or bottom outlet and driven at a sufficient speed to cause all insoluble foreign matters in the fluid to separate out and fly to the walls of the drum, where they are arrested and aggregate, while the clear fluid, still containing said principles in solution, discharges from the drum. Having thus obtained a clear and pure extract solution in a manner very superior to that obtainable by any filtering process, said fluid is conveyed to any suitably-adapted refrigerating apparatus, wherein its temperature is reduced to about 33° Fahrenheit in order to cause the tannin, theine, and other best and most valuable principles of the tea not soluble in cold water to be thrown out of solution, in consequence of which the fluid acquires a cloudy or "creamy" appearance. In this state the fluid is again passed through a rapidly-rotating centrifugal separator similarly adapted as hereinbefore described, which separates out those valuable principles which had been, as described above, thrown out of solution and which being specifically heavier than the fluid are now by very rapid centrifugal force imparted to the fluid by the rotation of the drum made to adhere to the inside walls of the drum, where they aggregate into a solid paste or caky mass, while the clear fluid from which such principles have been extracted discharges from the drum. The discharged fluid is then concentrated by evaporation, and the described process of refrigeration and separation are repeated to obtain a further aggregation of such principles. The described processes of concentration, refrigeration, and separation may also be repeated until the whole of such principles not soluble in cold water are obtained. Ultimately the remaining clear fluid containing such of the desired valuable principles as are soluble in cold water is evaporated to dryness and reduced to a fine powder. The respective drum-separated extracts upon removal from the drums are also dried and reduced to a fine powder without loss of aroma, flavor, or pungency.

The evaporation of the fluids and the drying of the thick or caky masses extracted from them may be effected in shallow vessels placed over heated surfaces in vacuum-pans or by any other suitable means, and during the process, if not effected in vacuum-pans, carbonic-acid gas may be passed over or through the fluids or the pasty masses to avoid or minimize atmospheric oxidation of the tannin and other constituents of the extract which would tend to lessen the value of the finished product.

The several powders obtained as hereinbefore described may be used separately as tea extract or may be mixed or blended together as desired to form a tea extract. Such tea extracts may be flavored with any flavor such as may be obtained from the essential oils of tea or may be blended with an extract of milk or milk preservative and may be compressed into cakes, tablets, or the like, which may be coated with sugar or other preservative.

The extracts may be obtained as a thick fluid or other syrupy consistence by not evaporating it or its constituent extracts to dryness.

What we claim as our invention, and desire to secure by Letters Patent, is—

1. The process of obtaining a soluble extract of tea consisting in the consecutive steps of obtaining the valuable principles of the tea-leaf in solution by steeping the leaves in hot water; removing all insoluble foreign matters from the fluid by keeping said principles in solution by keeping the fluid hot, and passing the fluid while hot, through a centrifugal separator adapted to retain the insoluble foreign matters and to discharge the clear fluid containing said principles in solution; separating from the clear fluid those principles not soluble in cold water by refrigerating the fluid to throw such principles out of solution and passing the fluid while cold through a centrifugal separator adapted to retain such principles and to discharge the clear fluid, concentrating the discharged fluid by evaporation and repeating the refrigeration and separation; separating from the clear fluid the valuable principles soluble in cold water by evaporating the clear fluid; and evaporating such extracts, as set forth.

2. The process of obtaining a soluble extract of tea consisting in the consecutive steps of obtaining the valuable principles of the tea-leaf in solution by steeping the leaves in hot water; removing all insoluble foreign matters from the fluid by keeping said principles in solution by keeping the fluid hot, and passing the fluid while hot, through a centrifugal separator adapted to retain the insoluble foreign matters and to discharge the clear fluid containing said principles in solution; separating from the clear fluid those principles not soluble in cold water by refrigerating the fluid to throw such principles out of solution and passing the fluid while cold through a centrifugal separator adapted to retain such principles and to discharge the clear fluid, concentrating the discharged fluid by evaporation and repeating the refrigeration and separation; separating from the clear fluid the valuable principles soluble in cold water by evaporating the clear fluid; and evaporating all such extracts to dryness, as set forth.

In testimony whereof we have signed this specification in the presence of two subscribing witnesses.

JOHN ROGER.
MONTAGUE KELWAY BAMBER.

Witnesses:
F. LIESCHING,
I. G. GUIGER.